United States Patent
McFarthing

(10) Patent No.: US 9,112,543 B2
(45) Date of Patent: Aug. 18, 2015

(54) NEAR FIELD COMMUNICATION DEVICES AND METHODS

(71) Applicant: Anthony Lawrence McFarthing, Littleport (GB)

(72) Inventor: Anthony Lawrence McFarthing, Littleport (GB)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 148 days.

(21) Appl. No.: 13/729,000

(22) Filed: Dec. 27, 2012

(65) Prior Publication Data

US 2014/0187150 A1  Jul. 3, 2014

(51) Int. Cl.
    *H04B 5/00* (2006.01)

(52) U.S. Cl.
    CPC .................. *H04B 5/0037* (2013.01)

(58) Field of Classification Search
    USPC .......... 455/41.1, 41.2, 42, 73; 340/10.1, 10.3, 340/10.5
    See application file for complete search history.

(56) References Cited

U.S. PATENT DOCUMENTS

| | | | | |
|---|---|---|---|---|
| 8,183,981 | B2* | 5/2012 | Liu et al. | 340/10.1 |
| 8,451,098 | B2* | 5/2013 | Posamentier | 340/10.5 |
| 2002/0052563 | A1 | 5/2002 | Penn | |
| 2008/0150698 | A1* | 6/2008 | Smith et al. | 340/10.4 |
| 2009/0040022 | A1* | 2/2009 | Finkenzeller | 340/10.1 |
| 2009/0146796 | A1* | 6/2009 | Goto et al. | 340/10.51 |
| 2010/0052869 | A1 | 3/2010 | Stewart | |
| 2010/0112940 | A1 | 5/2010 | Yoon | |
| 2010/0259216 | A1 | 10/2010 | Capomaggio | |
| 2010/0311327 | A1 | 12/2010 | Hamada | |
| 2010/0320962 | A1 | 12/2010 | Sekita | |
| 2011/0025264 | A1 | 2/2011 | Mochida | |
| 2012/0049791 | A1 | 3/2012 | Tanabe | |
| 2013/0005249 | A1* | 1/2013 | Nahidipour | 455/41.1 |

FOREIGN PATENT DOCUMENTS

JP  2011-062008  3/2011

OTHER PUBLICATIONS

International Standard, ISO/IEC 18092, Information Technology—Telecommunications and Information Exchange Between Systems—Near Field Communication—Interface and Protocol (NFCIP-1), Jan. 4, 2004, pp. 1-64.
International Standard, ISO/IEC 14443-1; Identification Cards—Contactless Integrated Circuit Cards—Proximity Cards—Part I: Physical Characteristics, Jun. 15, 2008, pp. 1-9.
Search Report dated May 27, 2014 issued in corresponding application GB1314829.1.

* cited by examiner

*Primary Examiner* — Blane J Jackson
(74) *Attorney, Agent, or Firm* — Pillsbury Winthrop Shaw Pittman LLP

(57) ABSTRACT

Methods and devices are disclosed, including a method of communicating, the method comprising transmitting, in a first time period, a signal for powering a communications device, and communicating, in a second time period, with the communications device using one of phase shift keying (PSK), frequency shift keying (FSK) and quadrature amplitude modulation (QAM).

54 Claims, 4 Drawing Sheets

NEAR FIELD COMMUNICATION DEVICES AND METHODS

FIELD OF THE INVENTION

Embodiments of this invention relate to communications, methods and devices, and in particular to Near Field Communication (NFC) communications with a high data rate and/or bandwidth.

BACKGROUND OF THE INVENTION

In NFC communications where an active reader communicates with a passive tag, there is a need for the reader to wirelessly power the tag before data transfer between the reader and tag can begin. A signal wirelessly transmitted from the reader to the tag can be used by the tag to extract sufficient energy to power the tag. There is also an ongoing need for the reader to wirelessly power the tag. The reader and tag each have an antenna tuned to a carrier frequency, such as 13.56 MHz, with high Q and a consequent narrow bandwidth, to ensure that sufficient energy can be transmitted from the reader to the tag for powering the tag. As a result, NFC data communication rates are limited, for example to a practical maximum of 424 kbps.

Thus, there is a need to increase the data rate available to NFC devices such as readers and tags.

SUMMARY OF THE INVENTION

According to a first aspect of embodiments of the invention, there is provided a method of communicating, the method comprising transmitting, in a first time period, a signal for powering a communications device, and communicating, in a second time period, with the communications device using one of phase shift keying (PSK), frequency shift keying (FSK) or quadrature amplitude modulation (QAM).

Therefore, for example, the rate of data communications between an NFC reader and tag can be increased by transmitting in the second time period using a particular modulation scheme. In the first time period, for example, sufficient power can be transmitted to power passive devices and in the second time period, for example, high data rate communications may be used when the passive device may not need to receive large amounts of power. For example, the passive device may use power extracted during the first time period to power itself during the second time period, or to make up for any shortfall in power extracted during the second time period. In some embodiments, no data is transmitted in the first time period.

In some embodiments, the transmitting and communicating steps are periodically repeated, for example approximately every 10 µs, and particularly for example every 9.4 µs which is the period of a data bit for the lowest data rate used in NFC of 106 kbps. Storing power for this length of time is a practical proposition which would use practical sizes of charge storage devices, for example capacitors.

In some embodiments, transmitting in the first time period comprises adjusting a Q factor of an antenna system used to transmit the signal to a first value, and communicating in the second time period comprises adjusting the Q factor of the antenna system to a second value and using the antenna system for the communicating, and wherein the first value is higher than the second value. Therefore, for example, a signal can be transmitted or received in the second time period that has a wider bandwidth than possible in the first time period, and hence the signal may have a higher data rate than that possible when the Q is high. In other embodiments, transmitting in the first time period comprises using a first antenna system having a first Q factor, and communicating in the second time period comprises using a second antenna system having a second Q factor, wherein the first Q factor is higher than the second Q factor.

According to a second aspect of embodiments of the invention, there is provided a method of communicating, the method comprising receiving at a communications device, in a first time period, a signal for powering the communications device, and communicating, in a second time period, with another communications device using one of phase shift keying (PSK), frequency shift keying (FSK) or quadrature amplitude modulation (QAM).

According to a third aspect of embodiments of the invention, there is provided a wireless communications device, comprising means for transmitting, in a first time period, a signal for powering another wireless communications device, and means for communicating, in a second time period, with the another wireless communications device using one of phase shift keying (PSK), frequency shift keying (FSK) or quadrature amplitude modulation (QAM).

According to a fourth aspect of embodiments of the invention, there is provided a wireless communications device, comprising means for receiving, in a first time period, a signal for powering the wireless communications device, and communicating, in a second time period, with another wireless communications device using one of phase shift keying (PSK), frequency shift keying (FSK) or quadrature amplitude modulation (QAM).

At least some of the additional features of the first aspect may also be applicable to the second, third and/or fourth aspects.

According to a fifth aspect of embodiments of the invention, there is provided a wireless communications device, the device comprising a transmitter for transmitting, in a first time period, a signal for powering another wireless communications device, and a communications circuit for at least one of transmitting and receiving a data signal in a second time period, wherein the data signal is modulated using one of phase shift keying (PSK), frequency shift keying (FSK) or quadrature amplitude modulation (QAM).

The device may comprise, for example, an NFC reader. In some embodiments, a Q factor of an antenna system (which may include for example an antenna and an antenna matching circuit) used in both first and second time periods is adjustable to a first value in the first time period, and the Q factor of the amplifier and the antenna system is adjustable to a second value in the second time period, and wherein the first value is higher than the second value. Thus, signals with a higher bandwidth may be transmitted in the second time period. In some embodiments, the Q factor is adjusted by adjusting an impedance of the antenna system (for example, where the antenna system includes an antenna and an antenna matching circuit, the impedance of the matching circuit is adjusted). The impedance may comprise a resistance. Additionally or alternatively, the Q factor may be adjusted by adjusting an output impedance of an amplifier in the antenna system.

In some embodiments, a first antenna system is used in said first time period and having a first Q factor, and a second antenna system used in said second time period and having a second Q factor, wherein said first Q factor is higher than said second Q factor. In such embodiments, for example, an adjustable antenna matching circuit (for example) may not be required. Additionally or alternatively, such embodiments may reduce or eliminate a delay associated with adjusting the Q of some examples of a single antenna system with an adjustable Q.

According to a sixth aspect of embodiments of the invention, there is provided a wireless communications device, comprising an antenna system, a receiver for receiving, in a first time period, a signal for powering the wireless communications device, and a communications circuit for at least one of transmitting and receiving a data signal in a second time period, wherein the data signal is modulated using one of phase shift keying (PSK), frequency shift keying (FSK) or quadrature amplitude modulation (QAM).

The device may comprise, for example, an NFC tag. In some embodiments, both the signal received for powering the device and the data signal are received from another device such as an NFC reader (alternatively, the data signal may be received from the NFC reader).

BRIEF DESCRIPTION OF THE DRAWINGS

Embodiments of the invention will now be described by way of example only with reference to the accompanying figures, in which.

DETAILED DESCRIPTION

Figure 1:
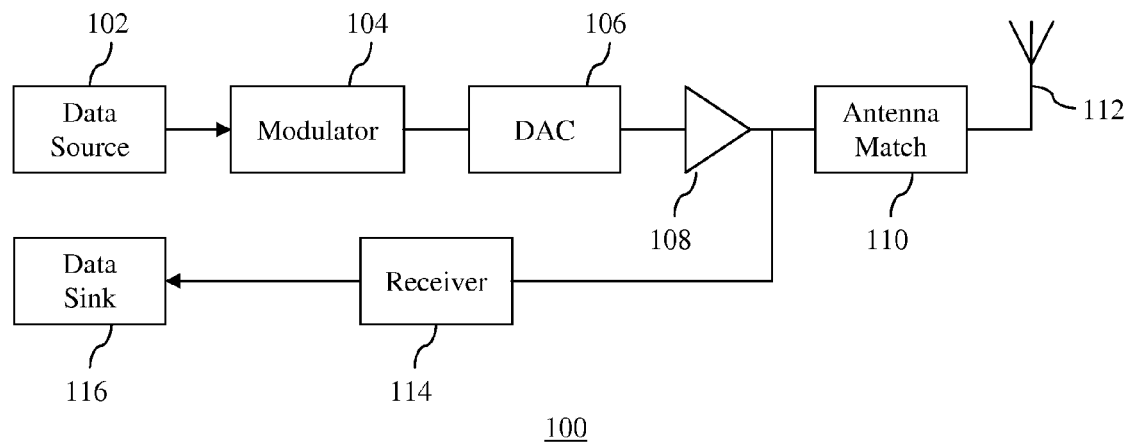
FIG. 1 shows a near field communications (NFC) reader device.

FIG. 1 shows at least some components of a conventional near field communications (NFC) reader device 100. The device 100 includes a data source 102, which supplies data to be transmitted to a modulator 104. The modulator 104 modulates data to be transmitted with a 13.56 MHz carrier wave in a manner described below with reference to FIG. 2. The modulator provides a modulated waveform to digital to analogue converter (DAC) 106, which provides an analogue signal to power amplifier 108. The amplifier 108 drives an antenna matching circuit 110 and antenna 112. Thus, a modulated signal is transmitted by the antenna to another NFC device such as an NFC tag.

Because a receiving NFC device may be passive, and thus may be powered entirely using energy recovered from a received signal, a high current is passed though the antenna 112. The antenna matching circuit 110 and the antenna 112 have a high Q factor and strong resonance at a centre frequency of 13.56 MHz. In order for a reader to transfer power to a tag the antenna assembly needs to have a high Q, which will have a narrow bandwidth, perhaps as low as 200 kHz, which limits the maximum data transfer rate.

The reader may also include a receiver portion 114 for receiving a signal transmitted to the antenna 112 by other NFC devices and extracting data therefrom. The receiver portion is known to those skilled in the art and thus is not described in detail. The receiver 114 provides received data to a data sink 116.

Figure 2:
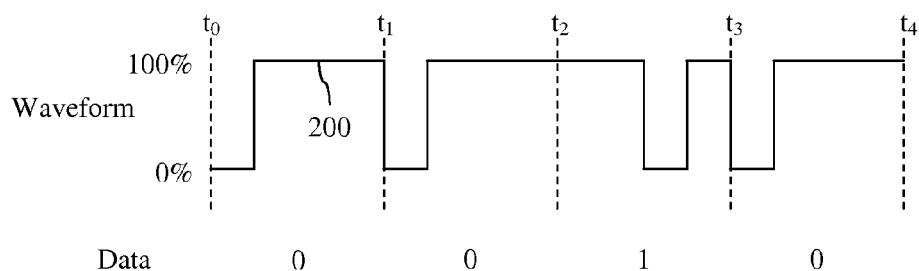
FIG. 2 illustrates a first NFC communication scheme (14443A)

FIG. 2 shows the modulation scheme employed by NFC reader 100, according to ISO/IEC 14443A (NFC-A). A first waveform 200 shows a data signal for amplitude modulating a carrier wave of 13.56 MHz (for example in the digital domain) before being converted to the analogue domain, amplified and transmitted. Due to the requirement for the reader 100 to power passive NFC devices such as NFC tags, the duty cycle of the waveform is chosen to be "high" ¾ of the time and "zero" ¼ of the time. The position of a "zero" portion within a time period indicates the data bit being conveyed during that time period. For example, between times $t_0$ and $t_1$ a zero is found in the first quarter of that time period, conveying a zero bit. Similarly, between times $t_1$ and $t_2$, and also between $t_3$ and $t_4$, a zero bit is conveyed. Between times $t_2$ and $t_3$ however, a zero can be found in the third quarter of the time period, thus conveying a '1' bit. Thus, the waveform 200 conveys the bits 0010. This signal 200, when used to amplitude modulate a carrier wave of 13.56 MHz, can be received by another NFC device that may then extract the conveyed bits accordingly. As the duty cycle of the waveform 200 is "high" ¾ of the time, sufficient power can be extracted from a received signal by a passive NFC device to power that device and enable it to extract the conveyed data, and may also enable it to transmit a response. A time period for transmitting one bit, such as the time period between times $t_0$ and $t_1$, between times $t_1$ and $t_2$, between times $t_2$ and $t_3$, and between times $t_3$ and $t_4$, is 9.4 µs.

Figure 3:
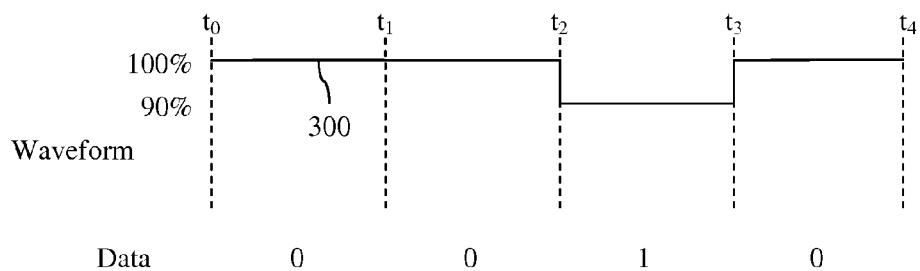
FIG. 3 illustrates a second NFC communication scheme (14443B)

FIG. 3 shows a modulation scheme including a waveform 300 for amplitude modulating a carrier wave according to ISO/IEC 14443B (NFC-B). This is similar to the waveform 200. In this scheme the transmitted level varies by only 10% so that the power level transferred to a tag remains high even when modulation is being transferred.

Figure 4:
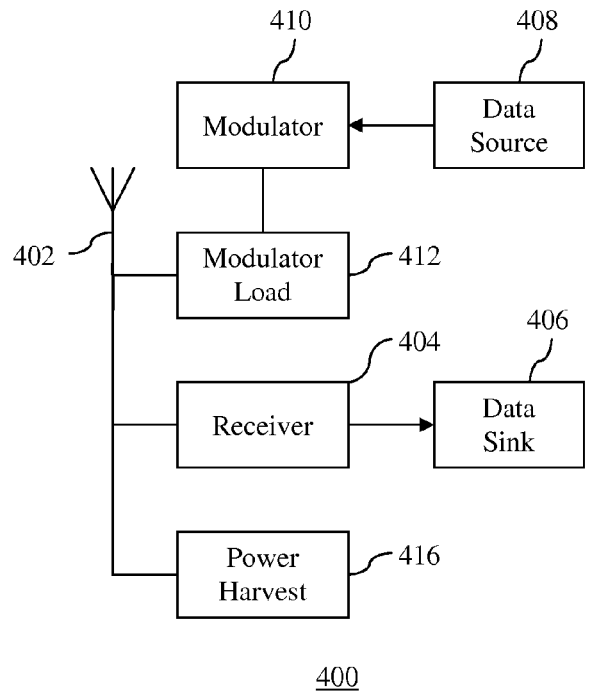
FIG. 4 shows a passive NFC tag device.

FIG. 4 shows a conventional passive NFC tag 400. The tag 400 includes an antenna 402 for transmitting and receiving signals. The tag 400 includes a receiver 404 connected to the antenna 402. The receiver 404 extracts data from a received signal in a manner known to those skilled in the art, and is not described in detail here. The received data is provided to a data sink 406.

The tag 400 also includes a data source 408 that provides data to a modulator 410. The modulator 410 provides a modulated signal, for example a binary bit stream representing data to be transmitted, to a modulator load 412. The modulator load 412 amplitude modulates the bit stream against a carrier wave (such as a 13.56 MHz wave) for transmission by antenna 402. More specifically, for example, the modulator load 412 loads the reader antenna with either a high and low value resistance that consequently amplitude modulates the reader drive signal. The reader receiver can then demodulate the resulting load modulated signal.

In addition, the tag 400 includes power harvester 416 that extracts power from received signals and uses that power for powering the tag 400. As such, the power harvester 416 may include the capability for rectifying, smoothing and regulating the level of a received signal and may also include power storage (such as a capacitor) such that the tag can be powered during periods when, for example, portions of a received signal are at zero amplitude as occurs in the signal of FIG. 2. As for the reader 100 shown in FIG. 1, the characteristics of the modulator load 412 also affect the bandwidth and hence the data rate of a signal transmitted by tag 400.

The inventor has realised that in the periods of zero amplitude shown in FIG. 2, where a device such as an NFC device receives zero power, a high data rate modulation scheme may be squeezed into these periods of time. Examples of such a scheme include phase shift keying (PSK), frequency shift keying (FSK) and quadrature amplitude modulation (QAM). Therefore, in a similar time period (e.g. 9.4 µs), where the schemes shown in FIGS. 2 and 3 transmit a single bit, embodiments of the invention may transmit and/or receive bursts at a much higher high data than before in between those times when the intention is to transfer power to the tag.

Figure 5:
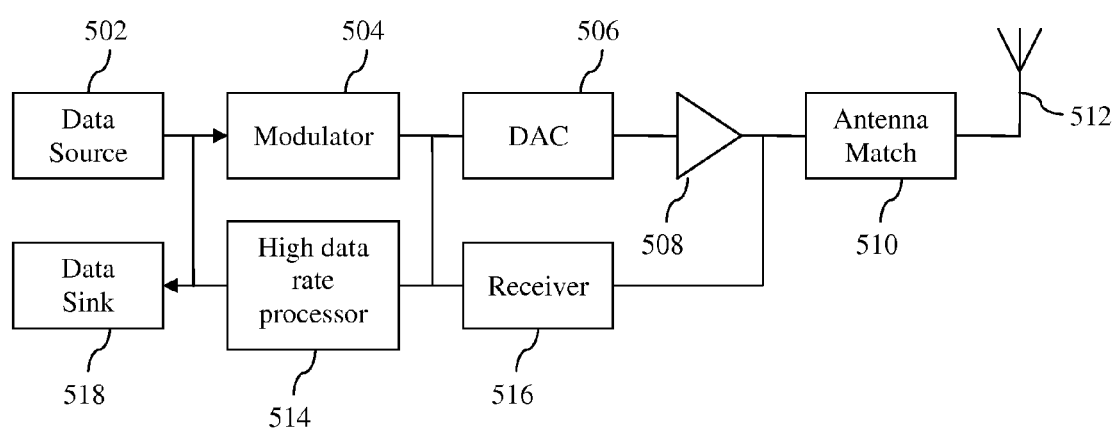
FIG. 5 shows a device according to embodiments of the invention.

FIG. 5 shows an NFC device 500 according to an embodiment of the invention. The device such as a reader includes a data source 502 that supplies data to a modulator 504. The modulator 504 provides a modulated signal to a digital to analogue converter (DAC) 506. The analogue signal from the DAC 506 is provided to an amplifier 508, and an anttenna system that includes antenna matching circuit 510 and antenna 512.

Data is also supplied by the data source 502 to high data rate (HDR) processor 514. The high data rate processor 514 supplies a modulated HDR signal to DAC 506 in a manner described below with reference to FIG. 6.

The NFC reader 500 also includes a receiver 516 for receiving a signal transmitted from another NFC device such as a NFC tag. The receiver 516 and HDR processor 514 extract HDR data from a received signal and provide the data to a data sink 518.

The components shown in FIG. 5 are merely an illustrative example, and the NFC reader according to embodiments of the invention may include more or fewer components. In addition, the components may be reordered as appropriate, or may be combined in a single component (for example, a single data processor may be used to implement one or more of the data source 502, modulator 504, HDR processor 514 and data sink 518). Furthermore, alternative implementations are envisaged that would be evident to those skilled in the art. For example, the modulator 504 is shown as being in the digital domain, whereas in an alternative embodiment the modulator may operate in the analogue domain. Accordingly, a DAC may precede an analogue modulator, for example. Example implementations of readers and tags in this scheme would have the same block diagram as shown in FIG. 5 but the tag would have an extra power harvesting block and the reader would have a PA with a high drive capability.

Figure 6:
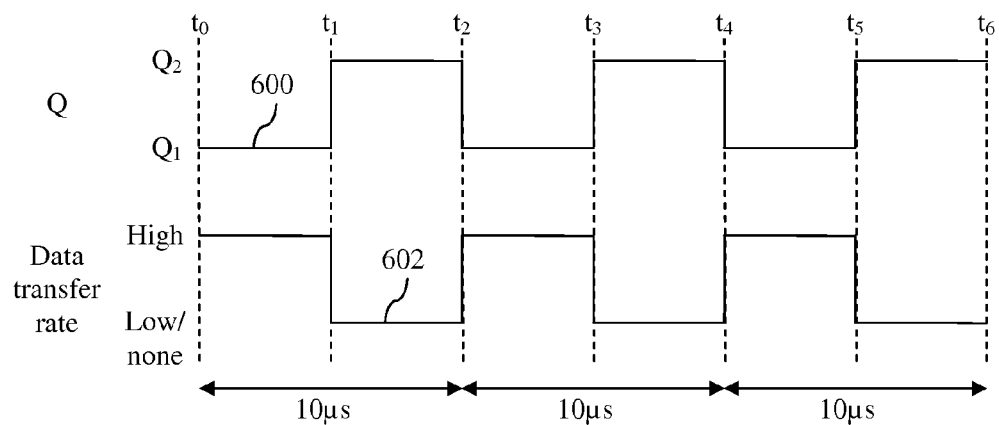
FIG. 6 illustrates a communication scheme according to embodiments of the invention.

Operation of the reader 500 when transmitting data will now be described with reference to FIG. 6. FIG. 6 shows a first waveform 600 illustrating adjustment of a Q factor of the antenna matching circuit 510 and antenna 512 shown in FIG. 5. Between times $t_0$ and $t_1$, the Q is at a "low" value $Q_1$, whereas between times $t_1$ and $t_2$ the Q is at a "high" value $Q_2$. It should be noted that the use of "low" and "high" in this context are relative terms and should not be construed as being "high" or "low" when compared to other systems. The low and high periods for Q are repeated periodically, such that between times $t_2$ and $t_3$, and between times $t_4$ and $t_5$, the Q is low, whereas between times $t_3$ and $t_4$, and between $t_5$ and $t_6$, the Q is high. The period for repetition in some embodiments is chosen to be around 10 µs, and may be 9.4 µs for example, though other periods can be used. The time for switching between low and high Q modes is shown as being at the mid point of each period, though the switch may occur at any point during each period as appropriate, may occur multiple times during each period, and/or may vary between periods.

Figure 7:
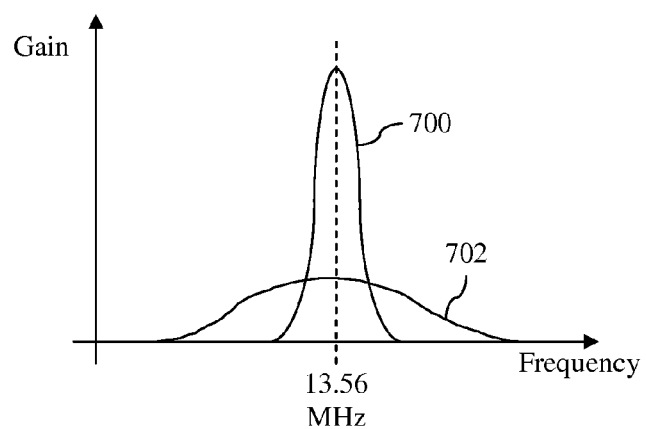
FIG. 7 illustrates a Q factor of an antenna system according to embodiments of the invention.

FIG. 7 shows a graph of frequency versus gain of the antenna matching circuit 510 and antenna 512, illustrating Q in both high and low modes. Specifically, curve 700 shows a high Q ($Q_2$) and curve 702 shows a low Q ($Q_1$). In high Q mode, the peak is higher and the bandwidth is lower as compared to the low Q mode. The centre frequency of both modes is the oscillation frequency $f_o$, for example 13.56 MHz.

FIG. 6 also shows a second waveform 602 illustrating a data rate of data transfer between the NFC reader 500 and another NFC device such as an NFC tag. As shown, when the Q of the antenna matching circuit 510 and antenna 512 is low, the data rate is "high". When the Q is high, the data rate is "low" or "none", illustrating that less data or no data at all is transmitted in the high Q mode. As the bandwidth of the antenna matching circuit 510 and antenna 512 is narrow in the high Q mode, the data rate of communications is limited. In some embodiments, the reader 500 transmits an unmodulated carrier in the high Q mode for powering a receiving device such as a tag, and no data is transferred. In the low Q mode, when the available bandwidth is wider, high data rate communications can occur. It should be noted that "high data rate" means that the rate of data transfer between the reader 500 and another NFC device, such as an NFC tag, is higher than conventional NFC communications such as those shown in FIGS. 2 and 3.

When an antenna assembly is switched between high Q and low Q conditions, in some embodiments depending on implementation, there may be some period of time during the transition when no data can be transferred while the Q is changing. A way of overcoming this delay would be to have two antenna assemblies at the NFC device where one is configured optimally and permanently for transferring power, high Q, and the other configured for high bandwidth (low Q). This could be accomplished in some embodiments, for example, by using concentric loop antennas that do not occupy any extra space. Therefore, for example, an NFC device may have multiple antenna systems each with a respective antenna and antenna matching circuit.

In the low Q mode, it may be the case that insufficient power can be extracted from a receiving device to power the device. In this case, the device may include power storage for storing power during the high Q mode, the stored power being used in the low Q mode for powering the device. It is noted that the maximum amplitude of a transmitted signal in the low Q mode may be lower than the amplitude of the signal in the high Q mode. This may not be a problem as the high data rate signal received by a device may have a large signal to noise ratio (SNR), even though the amplitude may be reduced in the low Q mode, but this still allows a receiver to recover data reliably.

Various modulation schemes for high data rate communications in the low Q mode are evident to the skilled person and can be used in the low Q mode for high data rate communications between the reader 500 and another NFC device such as a tag. For example, FSK, BPSK, QPSK, 16QAM, 64QAM, 128QAM, 256QAM and 1024QAM may all be used, as can any other suitable modulation scheme. Such schemes and the apparatus necessary to implement them are known to those skilled in the art and are thus not described in detail. It should be noted however that complex schemes such as 1024QAM are possible in an NFC system due to the typically high signal to noise ratio (SNR) present. The high SNR arises from the natural characteristics of magnetic field communications, relatively close antenna proximities, relatively large signal levels even in low Q mode and the low thermal noise levels from an NFC antenna. In some situations, for example, the SNR may exceed 40 dB or even 60 dB in a wide signal bandwidth.

The transmitted data may also include error detection coding or error correction coding, such as for example convolutional coding, Viterbi coding, Turbo coding, block coding (such as Reed-Solomon coding), low density parity check codes and the like. However, due to the high SNR that is likely for signals between the reader and other NFC device, an error detection or correction code may be unnecessary.

Figure 8:
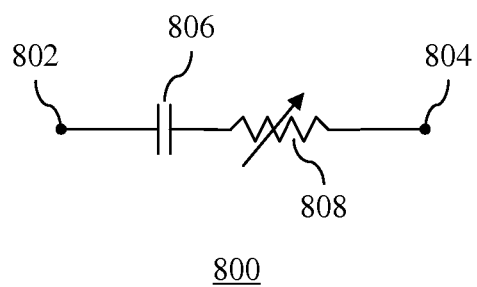
FIG. 8 shows an antenna matching circuit according to embodiments of the invention.

FIG. 8 shows an example implementation of an antenna matching circuit 800, though other implementations are possible including the alternative of using multiple antenna systems such as, for example, two (concentric) NFC loop antennas at an NFC device. The antenna matching circuit 800 is adjustable to adjust the Q of the antenna matching circuit 800 and connected antenna 512, and thus the potential bandwidth of transmitted signals. The circuit 800 includes a first node 802 for receiving a signal to be transmitted, for example as output from the power amplifier 508 shown in FIG. 5, and a second node 804 for providing a signal to an antenna for transmission. A capacitor 806 and a variable resistance 808 are connected in series between the nodes 802 and 804. In a high Q mode, for example when an unmodulated carrier signal is transmitted to a passive NFC device for powering the passive NFC device, a low resistance may be chosen for the variable resistance 808, for example 7 ohms. In low Q mode, a higher resistance may be chosen, such as 100 ohms, which has an effect similar to that shown in FIG. 7 on the Q factor of the antenna matching circuit and connected antenna. Any suitable implementation for the variable resistance 808 may be used, though in some embodiments a resistive digital to analogue converter (RDAC) could be used. In other embodiments, the Q factor could be adjusted by adjusting any one or more of the resistance 808, the capacitor 806, and/or the output impedance of the amplifier 508 shown in FIG. 5. In embodiments where the resistance in the antenna matching circuit is not varied, the resistance may be non-variable. Other embodiments may include alternative implementations of a circuit for adjusting the Q of the antenna matching circuit 510 and antenna 512.

Although the above examples relate to a NFC reader, it is evident to the skilled person that the principles disclosed herein can also be applied to other NFC devices such as passive NFC tags. Thus, for example, embodiments of the invention include a NFC tag that can receive a signal for powering the tag, and communicate at a high data rate in a manner as described above. Embodiments of the invention, therefore, may include devices that transmit a signal for powering another device in a first time period, and transmit and/or receive a high data rate signal in a second time period. In addition, embodiments of the invention may include devices that receive a signal for powering the device in a first time period, and transmit and/or receive a high data rate signal in a second time period.

What is claimed is:

1. A method of communicating, the method comprising:
    transmitting, in a first time period, a signal for powering a communications device; and
    transmitting, in a second time period, a data signal to the communications device using one of phase shift keying (PSK), frequency shift keying (FSK) and quadrature amplitude modulation (QAM),
    wherein transmitting in the first time period comprises adjusting a Q factor of an antenna system used to transmit the signal to a first value, and transmitting in the second time period comprises adjusting the Q factor of the antenna system to a second value and using the antenna system for the transmitting, and wherein the first value is higher than the second value.

2. The method of claim 1, wherein the communications device is a passive near field communications (NFC) tag.

3. The method of claim 1, wherein no data is transmitted in the first time period.

4. The method of claim 1, comprising periodically repeating the steps of transmitting in the first time period and transmitting in the second time period.

5. The method of claim 4, comprising repeating the steps approximately every 10 μs.

6. A method of communicating, the method comprising:
    receiving at a communications device, in a first time period, a signal for powering the communications device; and
    receiving, in a second time period, a data signal from another communications device, wherein the data signal is modulated using one of phase shift keying (PSK), frequency shift keying (FSK) and quadrature amplitude modulation (QAM),
    wherein receiving in the first time period comprises adjusting a Q factor of an antenna system used to receive the signal to a first value, and receiving in the second time period comprises adjusting the Q factor of the antenna system to a second value and using the antenna system for the receiving, and wherein the first value is higher than the second value.

7. The method of claim 6, wherein the communications device is a passive near field communications (NFC) tag and the another communications device is a NFC reader.

8. The method of claim 6, wherein no data is received in the first time period.

9. The method of claim 6, comprising periodically repeating the steps of receiving in the first time period and receiving in the second time period.

10. The method of claim 9, comprising repeating the steps approximately every 10 μs.

11. A wireless communications device, comprising:
    means for transmitting, in a first time period, a signal for powering another wireless communications device;
    means for transmitting, in a second time period, a data signal to the another wireless communications device using one of phase shift keying (PSK), frequency shift keying (FSK) and quadrature amplitude modulation (QAM); and
    antenna means, wherein a Q factor of the antenna means is adjustable to a first value in the first time period, and the Q factor of the antenna means is adjustable to a second value in the second time period, wherein the first value is higher than the second value, and wherein the antenna means is used in both the first and second time periods.

12. A wireless communications device, comprising:
    means for receiving, in a first time period, a signal for powering the wireless communications device;
    means for receiving, in a second time period, a data signal from another wireless communications device, wherein the data signal is modulated using one of phase shift keying (PSK), frequency shift keying (FSK) and quadrature amplitude modulation (QAM); and
    antenna means, wherein a Q factor of the antenna means is adjustable to a first value in the first time period, and the Q factor of the antenna means is adjustable to a second value in the second time period, wherein the first value is higher than the second value, and wherein the antenna means is used in both the first and second time periods.

13. A wireless communications device, comprising:
    a transmitter for transmitting, in a first time period, a signal for powering another wireless communications device; and
    a communications circuit for transmitting a data signal to the another wireless communications device in a second time period, wherein the data signal is modulated using one of phase shift keying (PSK), frequency shift keying (FSK) and quadrature amplitude modulation (QAM),
    wherein a Q factor of an antenna system is adjustable to a first value in the first time period, and the Q factor of the antenna system is adjustable to a second value in the second time period, wherein the first value is higher than the second value, and wherein the antenna system is used in both the first and second time periods.

14. The device of claim 13, wherein the Q factor is adjusted by adjusting an impedance of the antenna system.

15. The device of claim 14, wherein the impedance comprises a resistance.

16. The device of claim 13, wherein the Q factor is adjusted by adjusting an output impedance of an amplifier in the antenna system.

17. The device of claim 13, wherein the another wireless communications device is a passive near field communications (NFC) tag.

18. The device of claim 13, wherein the device transmits no data in the first time period.

19. The device of claim 13, wherein the device periodically repeats the first and second time periods.

20. The device of claim 19, wherein the device periodically repeats the first and second time periods approximately every 10 µs.

21. The device of claim 13, wherein the device is a near field communications (NFC) reader.

22. A wireless communications device, comprising:
a receiver for receiving, in a first time period, a signal for powering the wireless communications device; and
a communications circuit for receiving a data signal in a second time period, wherein the data signal is modulated using one of phase shift keying (PSK), frequency shift keying (FSK) and quadrature amplitude modulation (QAM),
wherein a Q factor of an antenna system is adjustable to a first value in the first time period, and the Q factor of the amplifier and the antenna system is adjustable to a second value in the second time period, wherein the first value is higher than the second value, and wherein the antenna system is used in both the first and second time periods.

23. The device of claim 22, wherein the Q factor is adjusted by adjusting an impedance of the antenna system.

24. The device of claim 23, wherein the impedance comprises a resistance.

25. The device of claim 22, wherein the Q factor is adjusted by adjusting an output impedance of an amplifier in the antenna system.

26. The device of claim 22, wherein the wireless communications device is a passive near field communications (NFC) tag.

27. The device of claim 22, wherein the device receives no data in the first time period.

28. The device of claim 22, wherein the device periodically repeats the first and second time periods.

29. The device of claim 28, wherein the device periodically repeats the first and second time periods approximately every 10 µs.

30. The device of claim 22, wherein the signal for powering the wireless communications device is received from a near field communications (NFC) reader.

31. The device of claim 30, wherein the data signal is received from the NFC reader.

32. A method of communicating, the method comprising:
transmitting, in a first time period, a signal for powering a communications device; and
transmitting, in a second time period, a data signal to the communications device using one of phase shift keying (PSK), frequency shift keying (FSK) and quadrature amplitude modulation (QAM);
wherein transmitting in the first time period comprises using a first antenna system having a first Q factor, and transmitting in the second time period comprises using a second antenna system having a second Q factor, wherein the first Q factor is higher than the second Q factor.

33. The method of claim 32, wherein the communications device is a passive near field communications (NFC) tag.

34. The method of claim 32, wherein no data is transmitted in the first time period.

35. The method of claim 32, comprising periodically repeating the steps of transmitting in the first time period and transmitting in the second time period.

36. The method of claim 35, comprising repeating the steps approximately every 10 µs.

37. A method of communicating, the method comprising:
receiving at a communications device, in a first time period, a signal for powering the communications device; and
receiving, in a second time period, a data signal from another communications device, wherein the data signal is modulated using one of phase shift keying (PSK), frequency shift keying (FSK) and quadrature amplitude modulation (QAM);
wherein receiving in the first time period comprises using a first antenna system having a first Q factor, and receiving in the second time period comprises using a second antenna system having a second Q factor, wherein the first Q factor is higher than the second Q factor.

38. The method of claim 37, wherein the communications device is a passive near field communications (NFC) tag and the another communications device is a NFC reader.

39. The method of claim 37, wherein no data is received in the first time period.

40. The method of claim 37, comprising periodically repeating the steps of receiving in the first time period and receiving in the second time period.

41. The method of claim 40, comprising repeating the steps approximately every 10 µs.

42. A wireless communications device, comprising:
a transmitter for transmitting, in a first time period, a signal for powering another wireless communications device;
a communications circuit for transmitting a data signal to the another wireless communications device in a second time period, wherein the data signal is modulated using one of phase shift keying (PSK), frequency shift keying (FSK) and quadrature amplitude modulation (QAM);
a first antenna system used in said first time period and having a first Q factor; and
a second antenna system used in said second time period and having a second Q factor, wherein said first Q factor is higher than said second Q factor.

43. The device of claim 42, wherein the another wireless communications device is a passive near field communications (NFC) tag.

44. The device of claim 42, wherein the device transmits no data in the first time period.

45. The device of claim 42, wherein the device periodically repeats the first and second time periods.

46. The device of claim 45, wherein the device periodically repeats the first and second time periods approximately every 10 µs.

47. The device of claim 42, wherein the device is a near field communications (NFC) reader.

48. A wireless communications device, comprising:
a receiver for receiving, in a first time period, a signal for powering the wireless communications device;
a communications circuit for receiving a data signal in a second time period, wherein the data signal is modulated using one of phase shift keying (PSK), frequency shift keying (FSK) and quadrature amplitude modulation (QAM);

comprising a first antenna system used in said first time period and having a first Q factor; and a second antenna system used in said second time period and having a second Q factor, wherein said first Q factor is higher than said second Q factor.

49. The device of claim 48, wherein the wireless communications device is a passive near field communications (NFC) tag.

50. The device of claim 48, wherein the device receives no data in the first time period.

51. The device of claim 48, wherein the device periodically repeats the first and second time periods.

52. The device of claim 51, wherein the device periodically repeats the first and second time periods approximately every 10 μs.

53. The device of claim 48, wherein the signal for powering the wireless communications device is received from a near field communications (NFC) reader.

54. The device of claim 53, wherein the data signal is received from the NFC reader.

\* \* \* \* \*